United States Patent [19]

Hartman

[11] Patent Number: 5,134,827
[45] Date of Patent: Aug. 4, 1992

[54] RADIALLY EXPANDABLE EDGE CONNECTOR SYSTEM

[76] Inventor: Paul H. Hartman, 11631 Cherry Hollow Dr., Chardon, Ohio 44024

[21] Appl. No.: 742,722

[22] Filed: Aug. 5, 1991

Related U.S. Application Data

[63] Continuation-in-part of Ser. No. 286,634, Dec. 16, 1988, abandoned.

[51] Int. Cl.⁵ .......................................... E05D 15/56
[52] U.S. Cl. ...................................... 52/586; 52/584; 52/506; 126/432; 126/450
[58] Field of Search .............................. 126/432, 450

[56] References Cited

U.S. PATENT DOCUMENTS

| | | | |
|---|---|---|---|
| 456,391 | 6/1891 | Andrus . | |
| 2,659,874 | 6/1953 | Veitch | 339/176 |
| 2,850,304 | 6/1958 | Wagner | 285/397 |
| 2,863,185 | 7/1958 | Riedi | 20/92 |
| 2,879,557 | 2/1959 | Wiegand | 20/15 |
| 2,972,495 | 5/1961 | Yalen | 287/54 |
| 3,027,609 | 10/1962 | Parkin | 20/92 |
| 3,371,454 | 8/1968 | Anderson | 52/122 |
| 3,484,830 | 2/1969 | Wagner | 285/397 |
| 3,547,475 | 12/1970 | Gingher | 287/103 |
| 3,557,503 | 1/1971 | Snyder | 52/586 |
| 3,574,367 | 12/1971 | Jankowski | 287/54 |
| 3,760,548 | 1/1973 | Sauer | 52/593 |
| 3,764,955 | 12/1973 | Ward | 339/65 |
| 3,966,342 | 10/1974 | Moriya | 403/405 |
| 4,032,208 | 6/1977 | Berkenhoff | 339/88 |
| 4,249,830 | 4/1981 | Day | 403/7 |
| 4,485,597 | 4/1984 | Worrallo | 52/36 |
| 4,511,201 | 4/1985 | Baker | 339/75 MP |
| 4,526,432 | 7/1985 | Cronin | 339/75 M |
| 4,593,508 | 1/1986 | Curatolo | 52/586 |
| 4,601,137 | 7/1986 | Bates | 52/586 |
| 4,613,193 | 10/1986 | Beers | 339/17 L |
| 4,634,195 | 1/1987 | Shoemaker | 339/17 F |
| 4,640,562 | 2/1987 | Shoemaker | 339/17 F |
| 4,655,516 | 4/1987 | Shaffer | 339/17 CF |
| 4,669,802 | 6/1987 | Schaffer | 439/535 |
| 4,684,181 | 8/1987 | Massit | 439/59 |
| 4,689,721 | 8/1987 | DeMerow | 361/388 |
| 4,721,358 | 2/1988 | Faber | 350/96.21 |
| 4,752,244 | 5/1988 | Kuhl | 439/635 |

FOREIGN PATENT DOCUMENTS 946984  1/1964  United Kingdom .................. 52/586

OTHER PUBLICATIONS

*Better than Gold*, DuPont Magazine, 2 pgs. Clegge & Gordon Way Publishing.
Home Energy for the Eighties, Wolfe, 1979, p. 61, pp. 75–125.
*Norton Sealant Solutions*, Norton Performance Plastics 1 page.
*Insulation Fastening Systems*, Celapino, Metal Building Review Jul. 1985, pp. 46–50.
Rockwall Panels, Insulation Panel Systems Inc. 1 page.
Temp-Con Panels, Emco Enterprises, 4 pages.
Technical Data Kynar Flex 2800/2801, Pennwalt Corp., 1986, 2 pages.
Kynar Polyvinylidine Fluoride, Penn Walt Corp., 1988, 20 pages.
*Santoprene* Bulletin No. TPE-02-07, Monsanto Co., 1988.
*Coil Coating is a Mature Industry*, Sullivan, Metal Bldg. Review Apr. 1986, pp. 19–21 Clegg & Gordon Way Publishing.
Home Energy for the Eighties, Wolfe, 1979 p. 46.
Solar Energy Calculation, Hartman 1988 1 pg.
Metal Building Review, Jul. 1986, pp. 26–27.
Metal Building Review, Mar. 1985, pp. 53–54.

Primary Examiner—Henry E. Raduazo

[57] ABSTRACT

A connector system for the attachment of component panels along the line of a joint. The panel to be joined has a dovetail shaped channel on the edge to be joined. A flexible connector has a curvilinear cross section containing a major arched portion and a minor arched portion inverted to it. Flattening the major arched portion by exerting a normal force on it drives the minor arched portion into the dovetail shaped channel, forming the joint. Removing the force releases the joint.

In the preferred form; a pair of connectors opposed to one another joint two solar/structural building panels. Slots on the inside surfaces of the connectors distribute air to the dovetail channels, and through a corrugated film bonded to the outer panel skin. Air returning to the dovetail channel on the opposite side of the panel is heated by sunlight.

22 Claims, 10 Drawing Sheets

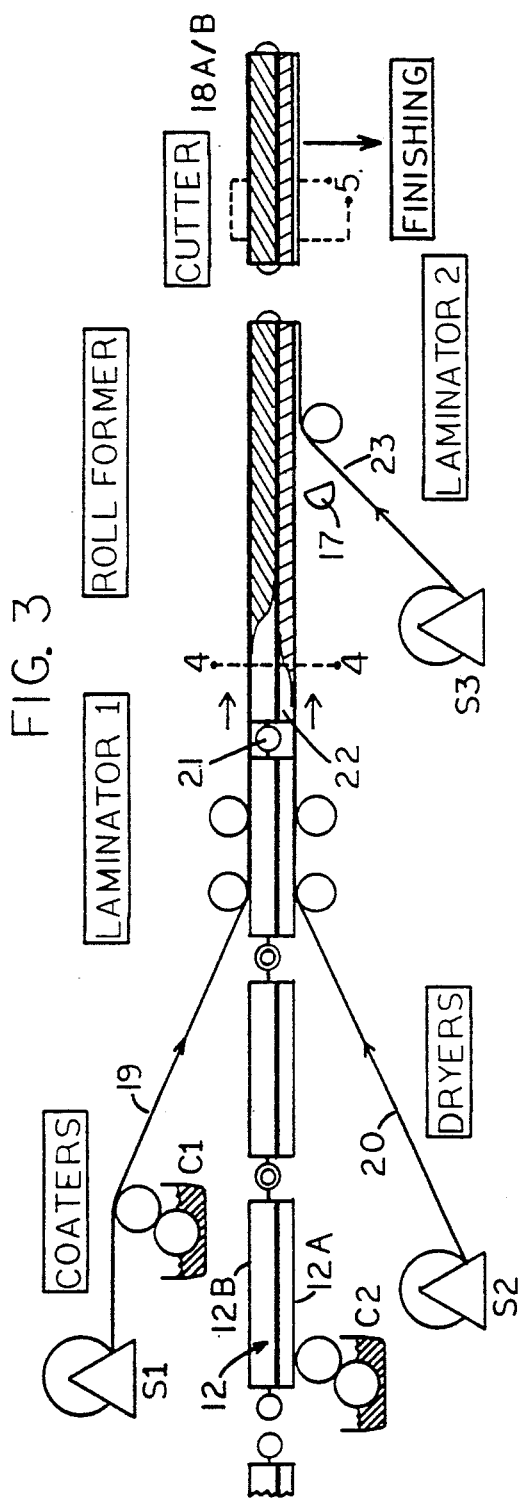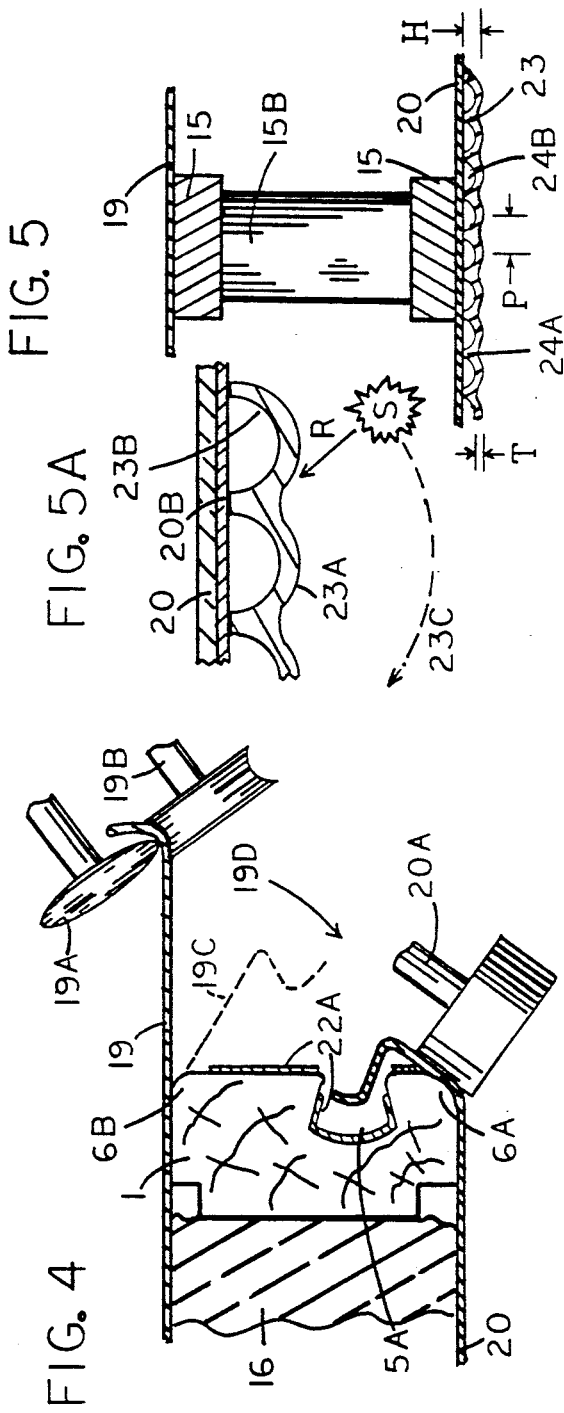

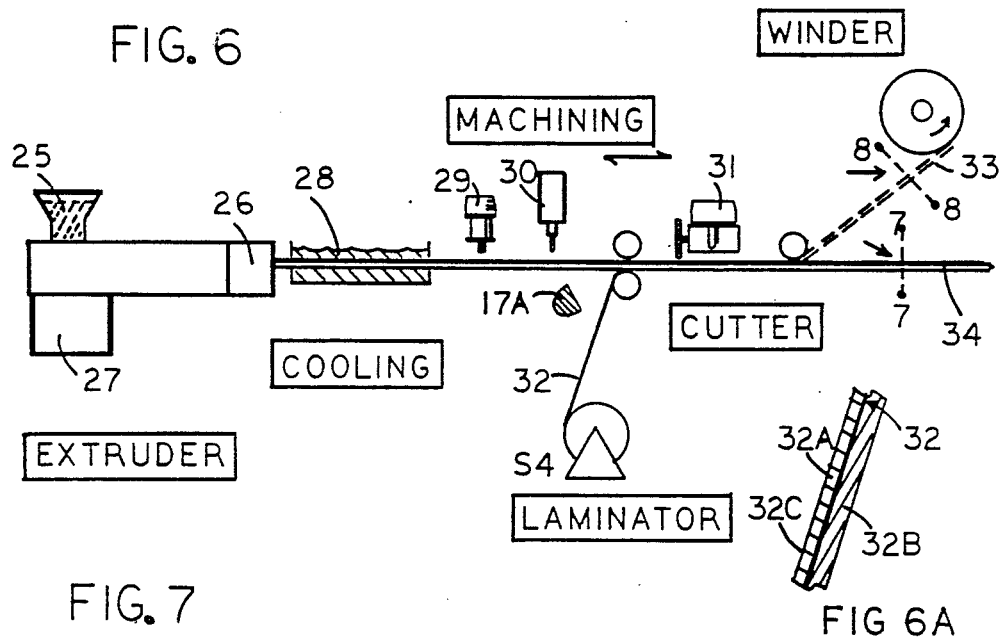
FIG. 6
FIG. 6A
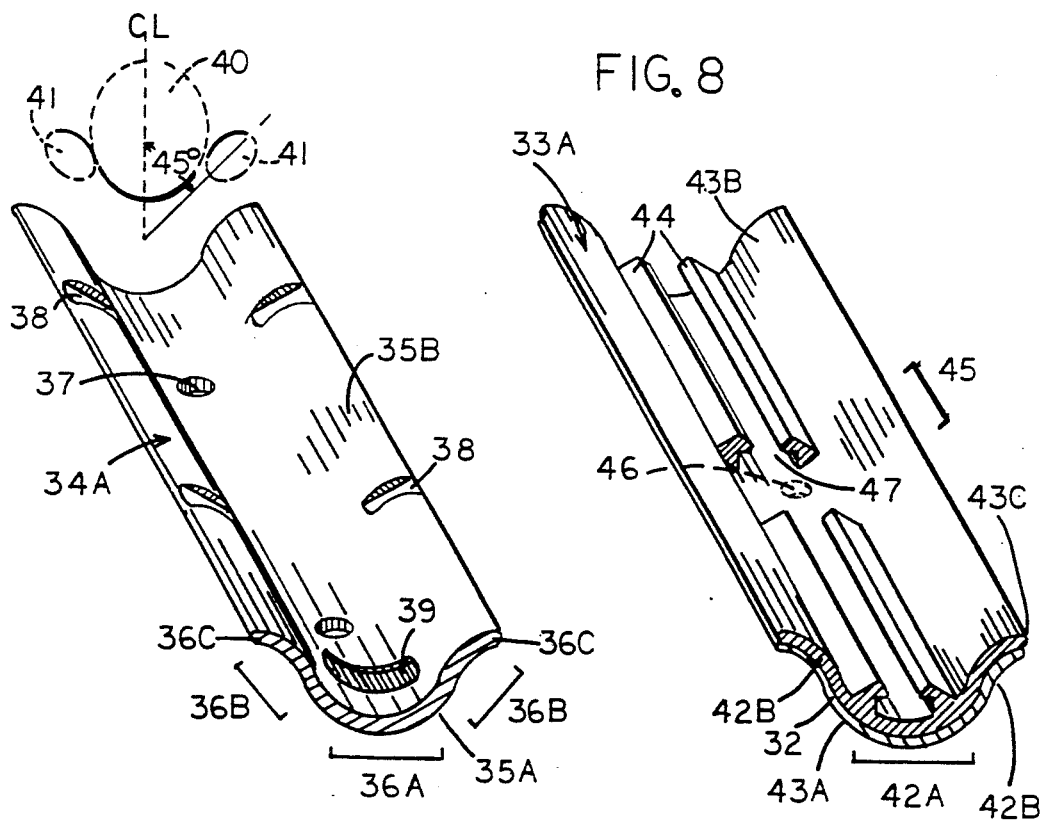
FIG. 7
FIG. 8

RADIALLY EXPANDABLE EDGE CONNECTOR SYSTEM

This application is a continuation in part of pending prior application Ser. No. 07/286,634 filed on Dec. 16, 1988 now abandoned of Paul H. Hartman for a Radially Expandable Edge Connector System.

BACKGROUND

1. Field of the Invention

This invention relates to connectors in general and specifically to an improved radially expandable edge connector system.

2. Description of the Prior Art

There have been many types of edge connector systems for prefabricated components in the prior art. But because of functional and cost limitations, the range of applicability has been limited to the relatively narrow areas of partition structures. As the invention has wider appicability, several peritinent areas of prior art will be discussed.

Heretofore, the assembly of components in edge connector systems has been a sequential operation, the insertion of a fastening member into the edge of a panel, followed by tightening operations, usually involving lateral movements of arms within a channel. Disassembly is the opposite sequence, requiring relative movement out of the edge of the panel by all subsequently assembled components, before removal of a prior assembled component. This has limited ease of interchangeability and restricted applications to semipermanent partition structures.

In general, the direct use of fasteners such as nails, screws, bolts, rivets and the like results in concentration of stress at isolated points of component attachment, rather than distribution along the whole line of a joint. The use of adhesive bonding, while evenly distributing stress in an assembled structure does not allow nondestructive component removal.

In the prior art of building structures, gaps between exterior components are weather sealed using overlapping components, sealants, caulks, rubber gasketed fasteners, thermoplastic methods, and standing seams. Despite the labor intensive nature of these methods, the leakage of roofs in commercial and industrial buildings is the major complaint of building owners, and a major cost ultimately bourne by consumers. While many building systems provide adequate connections between sheathing and frame members, poor connections are established between adjacent sheathing components. Valid prefabricated structural panel concepts, (ex. U.S. Pat. No. 2,879,557), are rarely used for lack of an adequate assembly method.

Because structural panel technology is not well developed, solar collectors have been viewed as largely add-on components, thus increasing costs over collector systems built into prefabricated building panels. The utilization of a small percentage of the sunlight currently bouncing off one market segment of the metal building industry would obviate the need for fifteen nuclear power plants.

SUMMARY OF THE INVENTION

It is an object of my invention to provide a simple, inexpensive, means for assembling prefabricated components which allows for maximum ease of replacement and interchangeability.

Other objects are: to provide an edge connector system that forms a seal weatherstripping a joint while also providing a good mechanical connection between two or more components. Another object is to provide a system for the construction of panelized buildings which can be assembled from inside the building, requires no perforation whatsoever of the building envelope from the outside and further allows the economical use of structural building panels in a dual function as solar collector panels.

The invention demonstrates advantages and improvements over prior art connector systems in a wide arena of applications both in its organization and mode of operation. Further objects, advantages and improvements can be discerned from examination of the drawings and descriptions.

As the connector system can be used to connect virtually any component; it is not intended to limit the invention to particular forms or species disclosed, but to include all modifications and alternative constructions falling within the spirit and scope of the invention as defined by the claims.

Briefly stated, the invention comprises a system for joining components to form a larger structure that uses one or more flexible connectors actuated by a clamping means.

Each component to be added to the structure carries a dovetail shaped channel on an edge surface. This channel runs the length of the desired connection. The width of the channel opening at the edge surface is less than the width of the channel within the body of the component, (hence the term 'dovetail'). The channel can be formed by extrusion, casting, milling, routing, sawing, or other means known to the art. The channel can also be formed by the assembly of subcomponents.

Prior to attachment, i.e. in the unactuated position, the component to be joined is moved to a location where the centerline of the channel opening is parallel and proximal to the tip of the flexible connector.

The second element of the invention is a flexible connector. In the unactuated position, the cross section of the connector contains a central high arch, defined as the major arched portion, which has a convex outer surface. This is continuous with a section of inverted arch, defined as the minor arched portion, which has a concave outer surface and a convex inner surface. The tip of the flexible connector lies at the extremity of the minor arched portion.

The third element of the invention, the clamping means, is a device or method to decrease the height of the major arched portion during the actuation process and hold it (the major arched portion) in a flattened position while the connector system is actuated. The clamping means has three parts; a device (or method) for pulling the apex of the major arched portion toward its inner surface, and a plate positioned to resist the parallel motion of the minor arched portion at its inner surface, and a means for holding the connector in the actuated position. The line of contact between the inner surface of the flexible connector and the surface of the motion resisting plate is defined as the axis of the joint. The axis of the joint lies parallel and proximal to the centerline of the channel opening and is the hub of the actuation process.

During the actuation process, the clamping means flattens the major arched portion through the opposed actions of the pulling device and the resisting plate. As motion of the pulling device away from the channel opening is restrained, (for specifics view the figures and descriptions), the tip of the flexible connector is displaced into the channel opening. As flattening proceeds, the tip of the flexible connector moves radially outward from the axis of the joint as the inner convex surface of the minor arched portion glides past the axis of the joint. In the fully actuated position, the apex of the major arched portion is held in position by the clamping means and the minor arched portion is held in tight contact with the interior walls of the channel. The axis of the joint now functions as the fulcrum of a lever formed by the flexible connector. Specifics on the mode of operation are detailed in the descriptions.

This motion allows for the joint to be formed or broken without gross movement of either of the components. Components can thus be attached or removed from a larger structure without movement of other parts of the structure. Proper design of the channel and the flexible connector allows for the minor arched portion to be urged into close contact with the interior walls of the channel. This effects both good sealing of the joint, and good electrical contact where conductive surfaces are involved. The flexible connector also absorbs vibration and minor movements within the larger structure.

BRIEF DESCRIPTION OF THE DRAWINGS

FIG. 3 is a diagram detailing the method of building panel manufacture.

FIG. 4 is a cross section showing the rollforming of skins into dovetail shaped channels.

FIG. 5 is a longitudinal section through a completed panel detailing the structure of the corrugated polymer film.

FIG. 5A is an enlarged section of the corrugated polymer film.

FIG. 6 is a diagram detailing the method of flexible connector and specialized clamping means manufacture.

FIG. 6A is an enlarged section of the resin laminate of FIG. 6.

FIG. 7 is an isometric view of a section of ordinary flexible connector.

FIG. 8 is an isometric view of a specialized flexible connector.

DETAILED DESCRIPTION OF THE DRAWINGS

Figure 1:
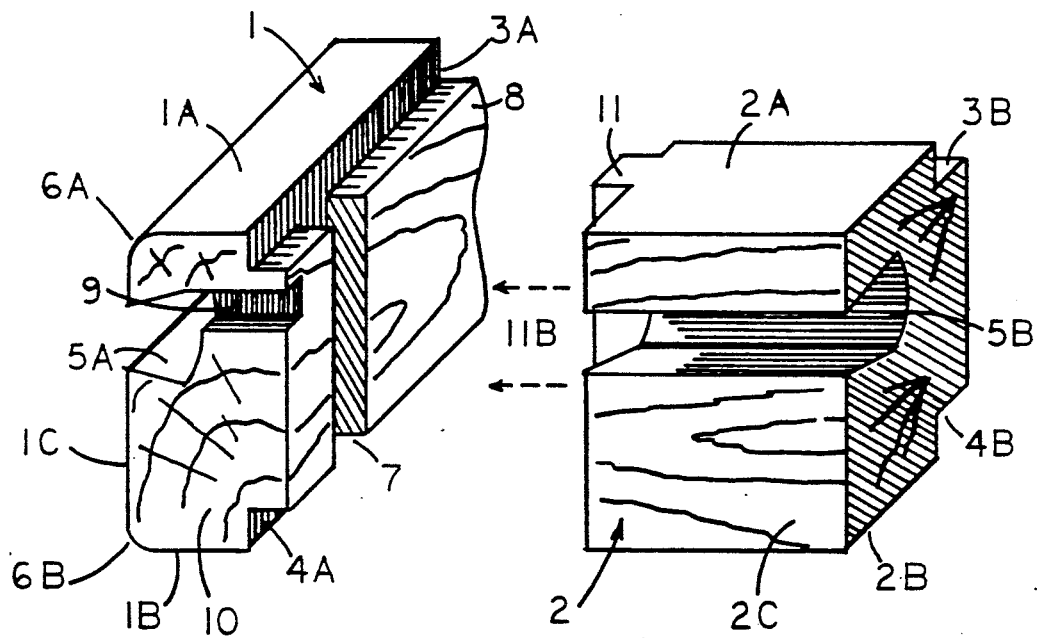
FIG. 1 is an isometric drawing of the side and end rails of a building panel.

FIG. 1 shows frame members of the component panels used in the invention. Both side rail 1 and end rail 2 are shaped from hardwood lumber by cutting upper 3A and B, and lower 4A and B rabbets on a table saw. Dovetail shaped channels 5A and 5B are cut into edge surfaces 1C and 2C using a router. Outside corners 6A and B are made using a ¼ round router bit. Similar rounding is done on end rails after frame assembly, (FIG. 2).

Side rails are cut to length, then finished with grooves 7 cut on inside surfaces 8 and shallow grooves 9 cut on end surfaces 10. End rails 2 are cut to length and ends finished with tongue projections 11 for later glue assembly (dotted arrows 11B) to the side rails.

Figure 2:
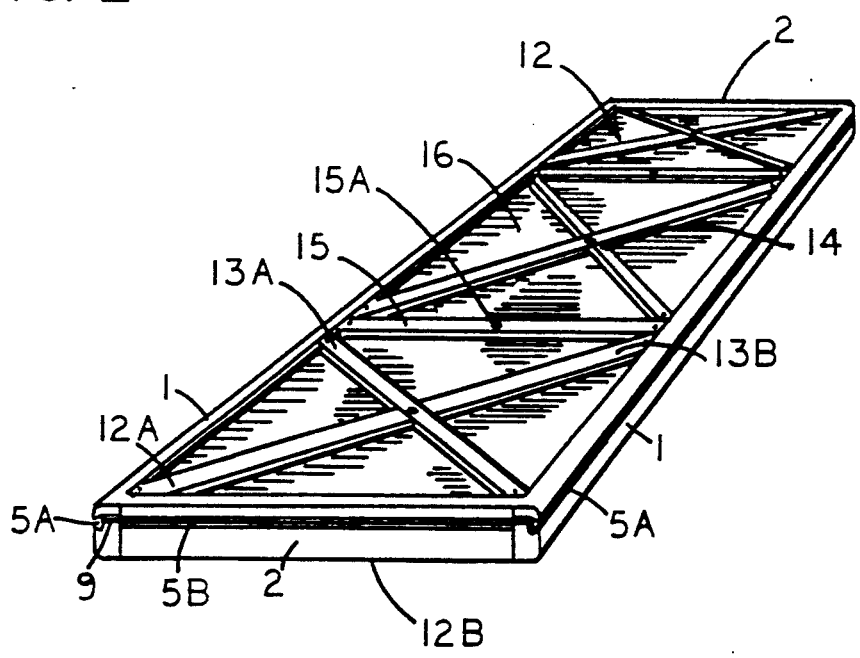
FIG. 2 is a perspective drawing of an assembled building panel frame.

The completed panel frame 12 used in the structural or solar panels of the invention is shown in FIG. 2. After the side-end rail assembly, diagonal braces 13A and 13B (preattached with half lap joint 14) are glued and nailed to the rabbets in the side and end frames. Cross braces 15 are attached in a like manner and insulation batt 16 inserted between the upper and lower (not shown) bracing structures. Dowels 15B (see FIG. 5) are attached with wood screws 15A as shown.

Careful study of FIG. 2 shows the dovetail channels 5A of the side rails connected to dovetail channels 5B of end rails by means of shallow grooves 9.

FIG. 3 is a diagram showing the manufacturing process for making solar/structural panels 18A (or plain structural panels 18B) from frames 12. Hinges (open circles) are temporarily affixed to end rails and pinned (concentric circles) to pull frames from left to right through the line.

An interior skin 19 is unwound from stand S1. Adhesive is coated on the unpainted side at offset gravure coater C1 and dryed progressing toward the laminator 1, where it is bonded to interior surfaces 12B. Similarly, exterior surfaces 12A of the frame are coated at offset coater C2, dryed, and laminated to the unpainted side of exterior skin 20 coming from stand S2.

A polyvinylidine chloride, PVDC, emulsion adhesive would be used at both coaters based on bond quality, fire retardance, and environmental considerations. Both skin layers are preferrably pre-painted aluminum sheet, with exterior skin 20 preferrably painted with a polyvinylidine fluoride, PVDF, based coating for weatherability and bondability.

At point 21, skins are bonded to frames and hinge pins can be removed for later ease of separation. Just before entering the roll former, (at point 22), additional PVDC adhesive 22A is sprayed and flash dryed on edge surfaces 1C and dovetail shaped channels 5A of the side rails.

At the roll former, (see FIGS. 3 and 4), the contours required to fit channel 5A are formed (example rollers 19A and 19B). The skins are then wrapped around corners 6A and B (example roller 20A) and bonded to adhesive layer 22A (thickness is exaggerated here).

Exterior skin 20 is first bonded to line the interior walls of 5A, then followed by interior skin 19; which locks both skins firmly in the channel. The later shape of skin 19 is indicated by dotted line 19C and locking movement by arrow 19D. (The completed assembly is shown in later figures).

At laminator 2, (see FIGS. 3 and 5), corrugated PVDF film 23 is payed off stand S3 and thermally bonded to PVDF painted surface 20B of exterior skin 20. Radiant heater 17 rapidly heats exposed PVDF surfaces to the melting point, they are then laminated with light pressure from the rollers.

Again referring to FIG. 3, a cutter indexing with line speed shears both skins releasing the individual panels 18A or 18B. These then go to a finishing operation where PVDF film 23 is thermally bonded to line side frame channels 5A. Additionally, skins 19 and 20 are precision cut, formed, and bonded to line the end rail grooves 5B and shallow grooves 9 in a manner analogous to the method described above.

Ordinary structural panels 18B are produced by the same process as, described above except the operation at laminator 2 is omitted and the width and depth of channels 5A and 5B is somewhat reduced to accommodate the absence of corrugated film 23 FIG. 5 details the manufacture and mode of operation of the bonded corrugated film as used in the invention. Dowels 15B shown in the view, tie cross braces 15 together providing deflection resistance in the laminating process and the end use of the panels.

Corrugated PVDF film 23 is produced on a 3 roll stack plastic sheet extrusion line. The upper roll is silicone rubber to produce a matte exterior surface 23A. The casting roll is textured with longitudinal grooves to produce the transverse ribs 24A seen in the finished film. The surface treatment of the casting roll and the polishing effect of heater 17 combine to give a glossy interior surface 23B on the film. A colored translucent PVDF resin, absorbing 5-20% of incident light in the finished film is preferred.

Typical film thicknesses, T, are 0.002" to 0.020". Typical height, H, of the corrugation is 0.030" to 0.1". Typical periods of the corrugation P are 0.060" to 0.2".

Capillary channels 24B (hereafter called capillaries) are formed in the bonding process at laminator 2. These run transversely to the long axis of collector panels 18A and carry air between dovetail shaped channels 5A on either side of the panels in the end use of the invention.

Reference to the enlarged inset in FIG. 5, ( and FIG. 11) shows the apparent path (dotted arrow 23C) of the sun, S, to be circumferential to the wavy exterior surface 23A produced by the process described above. The matte surface at 23A, and the relatively normal incidence of rays, R, throughout much of the day minimize reflections in the end use. Similarly, the glossy interior surface 23B and diffuse paint surface 20B serve to trap light in the capillary until it is absorbed. Air passing through the capillary in the end use effectively picks up heat before conductive losses to the exterior or building can occur.

FIG. 6 is a diagram showing the process for making flexible connectors 33, 34 and clamping means 48 used in the invention. Polymer pellets 25 are fed to extruder 27 which forces plastic through profile dies 26 to form the desired cross sectional shapes. Extrusions are cooled in a water bath 28, and further shaped and drilled using machine tools; represented here by router 29 and pneumatic drill 30. Additional laminates are optionally payed off unwind stand S4 and thermally bonded to the extrusions using radiant heater 17A in a manner analogous to that described in FIG. 3.

Completed extrusions are then either cut to length using saw 31 or rewound on a reel at the winder. Tools 29, 30, 31 index with line speed and are numerically programmed to form the grooves, holes, and stock removal shown in FIGS. 7 and 8.

One preferred resin for the manufucture of the flexible connectors of FIGS. 7 and 8 is PVDF on the basis of fire retardance and temperature resistance, although other suitable engineering thermoplastics can be used.

Enlarged inset in FIG. 6 shows laminate 32 (used in connector 33) to comprise two layers; an aluminum foil 32A, 0.001" to 0.010" thick, for bondability and fire retardance, and a sealing strip 32B, 0.010" to 0.125" thick, preferably made from a chlorinated or silicone rubber (for weather resistance and fire retardance). Bonding surface 32C is roughened for enhanced mechanical adhesion.

FIG. 7 shows one flexible connector 34A (hereafter called the manifold connector) used in the preferred form of the invention. The manifold connector has a roughly constant cross sectional thickness with a central high arch, the major arched portion, 36A continuous with identical minor arched portions 36B inverted to the major arched portion. Tips 36C lie at the ends of the minor arched portions.

In the unactuated shape shown, the outside surface 35A in the area of the major arched portion has a convex shape roughly equivalent to a 60° projection ellipse along its major axis, (see ref character 40 in the inset). The outer surface at the minor arched portions is concave and the inner surface 35B of the connector is convex in the area of the minor arched portions. The minor arched portion is shown to roughly take the form of a 45° projection ellipse oriented at a 45° angle to the centerline, (see ref character 41 in the inset.) These shapes roughly constitute the shape of the unactuated connectors.

In the actuated shapes, (seen in FIGS. 14, 16, 19, and 22), the major arched portion is flattened to a 30° projection ellipse, with the minor axis alligned with the centerline. The minor arched portions maintain the rough contours of a 45° projection ellipse, but the major axis is rotated towards an angle of 90° with the centerline.

While the precise ellipse descriptions above apply specifically to connectors 34A and 34B; the geometric descriptions relating to concave/convex/Minor Arched Portions/Minor Arched Portions/"flattening"/and relative angularity to the centerline define and apply to all flexible connectors within the scope of the invention.

Manifold connector 34A is modified on inner surface 35B with shallow slots 39 cut into the major arched portion for gripping fittings (See FIG. 10) Periodic slots 38 are cut into surface 35B at the minor arched portions for the distribution of air to and from the dovetail shaped channels, (see FIGS. 12 and 13-18)

Flexible connector 34B (shown in FIG. 19) is identical to manifold connector 34A in all respects except slots are omitted in the manufacturing process. (Connector 34B functions purely as a mechanical connector) Both 34A and 34B have periodic through holes 37 used for the passage of T-head bolts.

FIG. 8 shows the other connector 33A used in the preferred form of the invention, hereafter called the ledge connector. 33A is extruded and shown here in it's unactuated shape with major arched portion 42A flanked by minor arched portions 42B and tips 43C. Geometry and functionality are substantially identical to that described in FIG. 7. Inner surface 43B is modified to include ledge shaped projections 44 that form channel 47, used for the containment of T head bolts and alternate clamping means, (see FIGS. 9, and 20–22). Laminate 32 is bonded as shown in FIG. 6 and outer surface 43A of the connector is composed or rubber sealing strip 32B.

Projections 43B are periodically milled away in areas such as 45 to allow easy insertion of the T head bolts.

Flexible connector 33B (shown in FIGS. 20–22) is identical to the ledge connector in all respects save the cutting of optional tapped holes 46 in 33B and the absence of laminate 32 on outside surface 43A of 33B.

Figure 9:
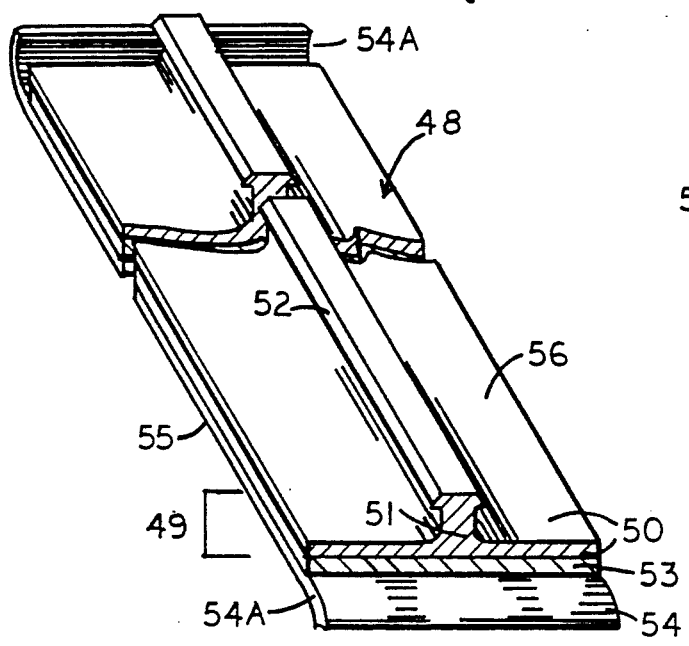
FIG. 9 is an isometric view of the specialized clamping means used in the end connection of panels.
Figure 20:
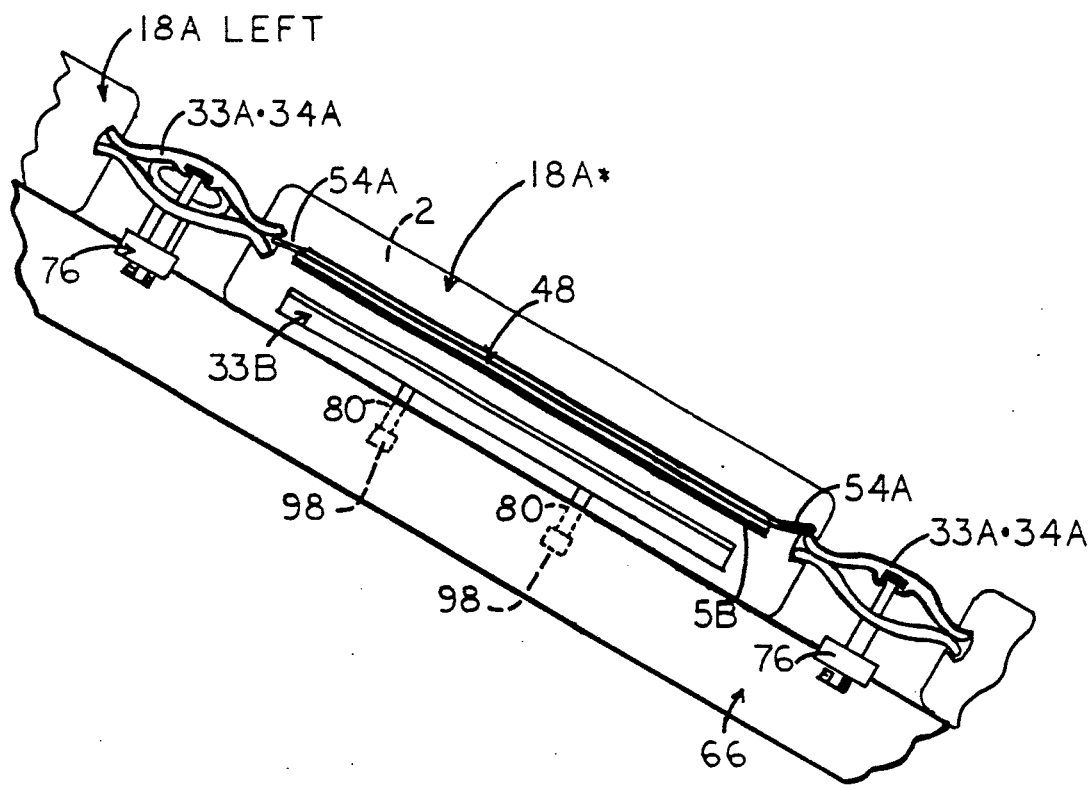
FIG. 20 is an elevation view of joint 73A of FIG. 11, disassembled to show pre-assembly operations.
Figure 21:
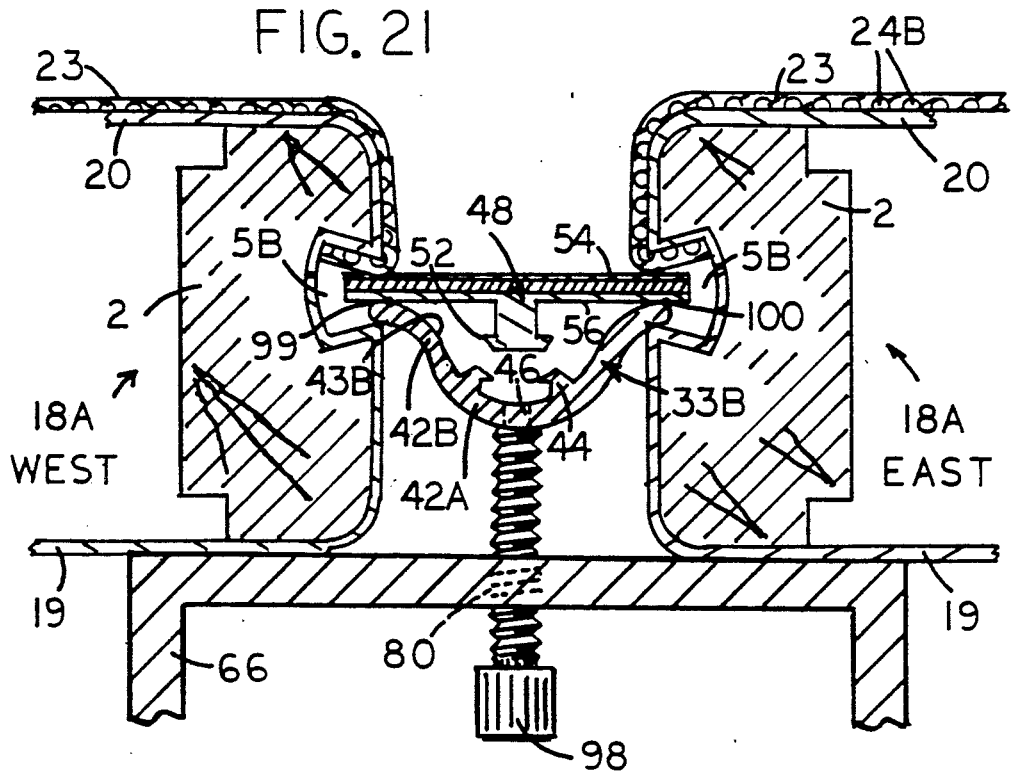
FIG. 21 is a partial section through joint 73 of FIG. 11, showing another alternate form of the invention in unactuated position.
Figure 22:
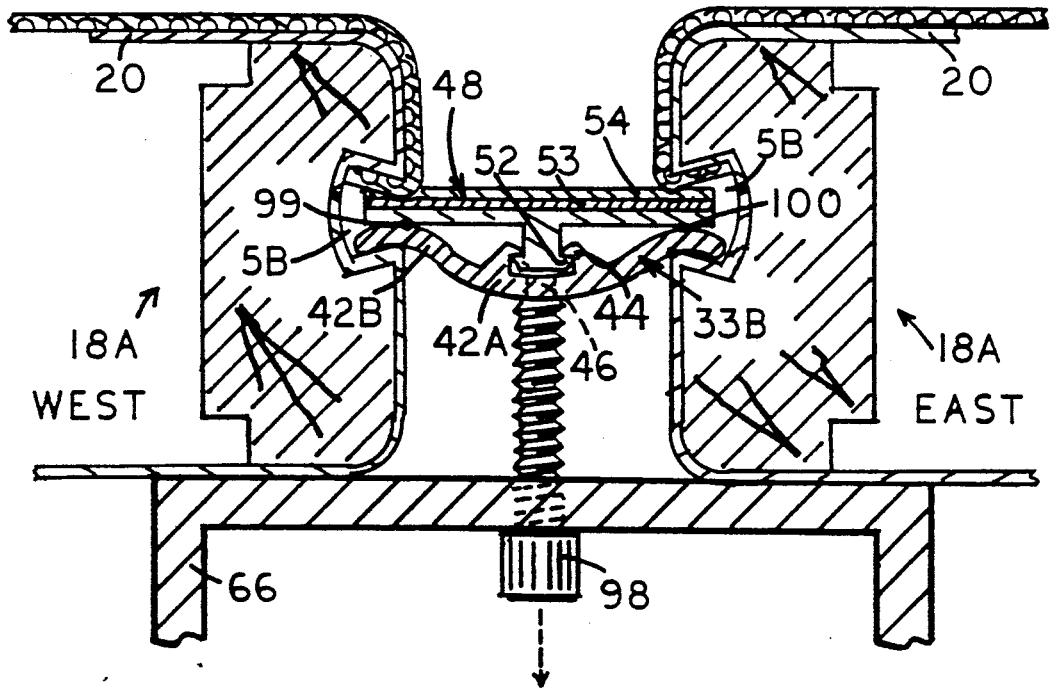
FIG. 22 is the same system as FIG. 21 in actuated position.

FIG. 9 shows finished Tee beam 48, used as a clamping means in the alternate form of the invention shown in FIGS. 20–22. The extruded portion 49, is made as in FIG. 6 using a suitable engineering thermoplastic. The cross section of the extruded portion consists of wide horizontal flange 50, and narrow web 51 which ends in narrow 'serif' 52, (as in sans serif). Serif 52 locks into channel 47 in the end use of the invention.

Soft rubber layer 53 is laminated by the process shown in FIG. 6 and the laminate of 49 and 53 cut to length using saw 31. Harder exterior rubber layer 54 is laminated off line to allow for the increased length needed to provide flaps 54A, (shown here and in FIG. 20). Rubber layer 54 is similar to 32B in composition, while being higher in durometer. The length of portion 49 is slightly less than the length of dovetail channel 5B in the end rail, (see FIGS. 2 and 20). The overall length including flaps 54A is slightly longer than the width of a panel.

Layer 54 provides an exterior sealing surface and mechanism, while interior surface 56 of wide flange 50 provides the motion resisting plate described in the summary.

Figure 10:
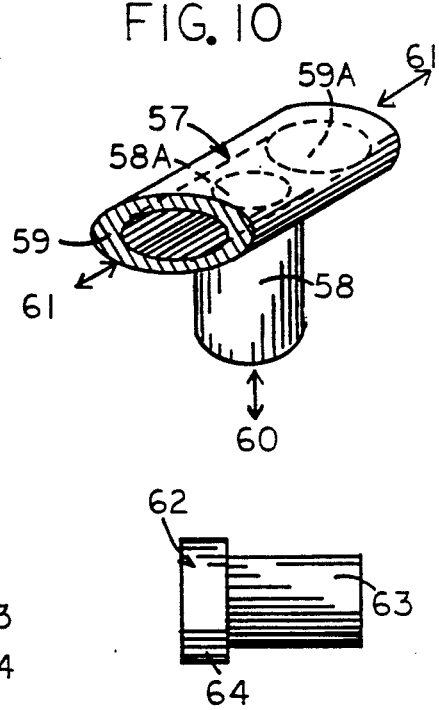
FIG. 10 is an isometric drawing of injection molded parts used in the invention.

FIG. 10 shows two rubber parts formed by a molding process that lock between flexible connectors 33A and 34A in the preferred form of the invention (FIGS. 12–16).

Figure 14:
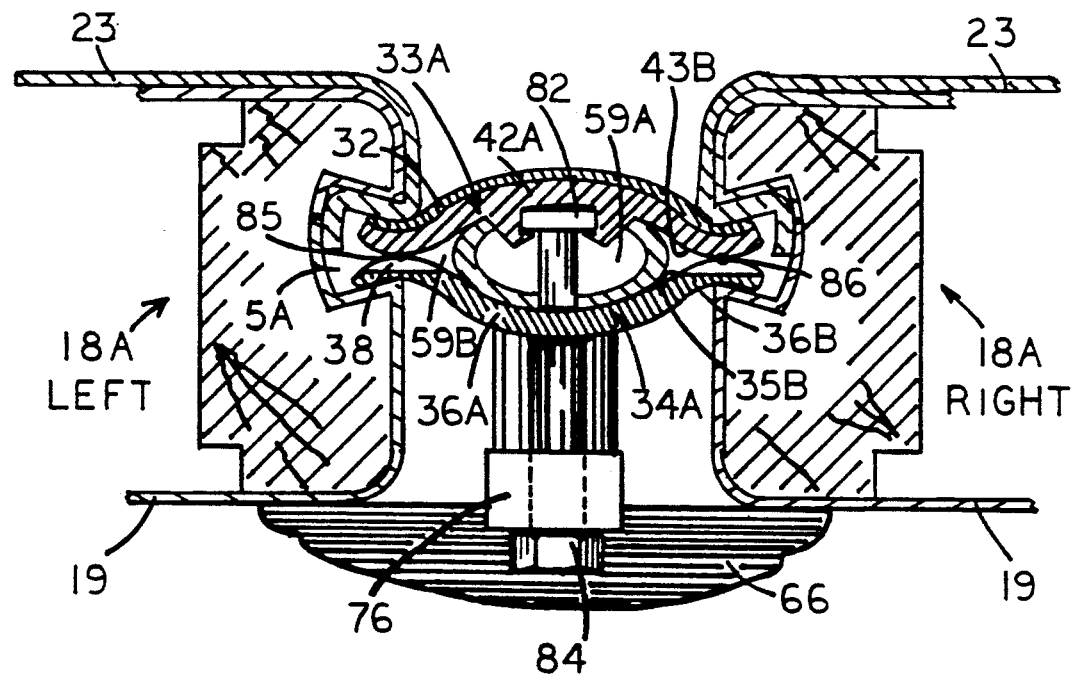
FIG. 14 is the same view showing the invention in actuated position.

Pipe tee 57 has side arm 58 with an outside diameter sized for tight fit in rafter holes 79. Lumen 58A of the side arm communicates with lumen 59A of the cross pipe section 59. Cross pipe section 59 has a cross section roughly corresponding to a 30° projection ellipse (see discussion of FIG. 7) to prevent occlusion of lumen 59A and allow good fit when clamped as shown in FIG. 14.

Double headed arrows 60 and 61 show functionality in use; air is supplied or returned to the rafter/duct 66 and supplied to or returned from the flexible connector assemblies as shown in FIGS. 14, 16, 17, and 18.

Solid end plug 62, (shown in side view), is made with a similar elliptical cross section. Plug portion 63 has similar dimensions to cross pipe 59 while the major axis of flange portion 64 is equal to the edge to edge spacing between panels. Other common pipe fittings such as ells, crosses, etc can be made in similar fashion but are not shown.

Figure 11:
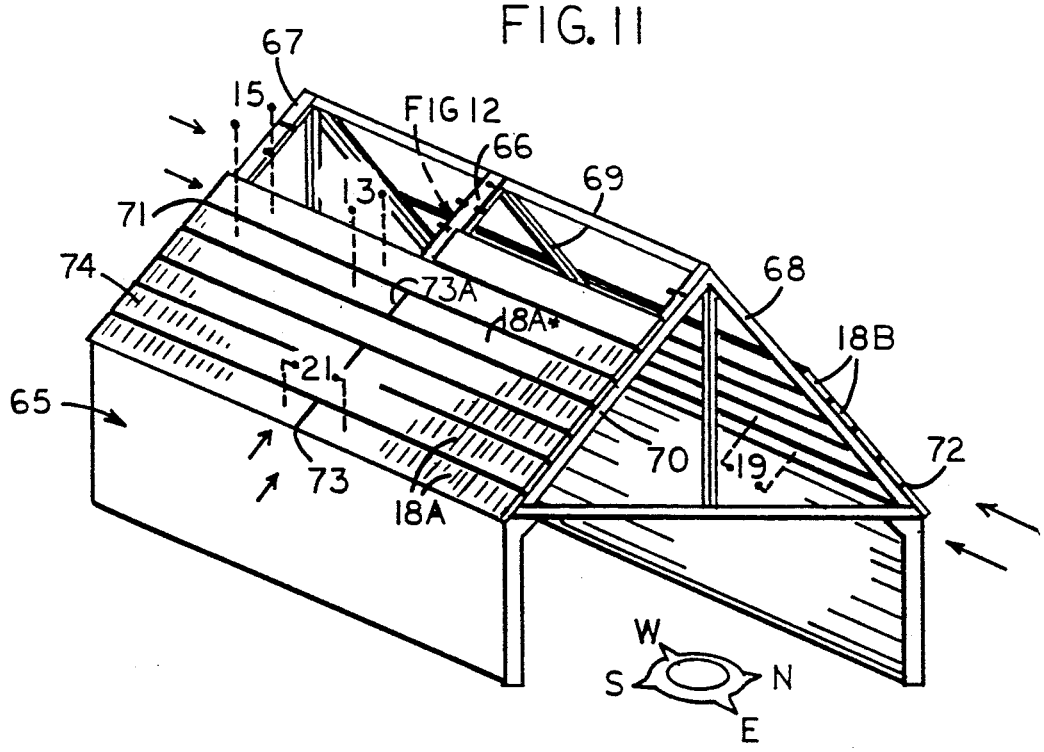
FIG. 11 is an isometric drawing of a building with solar collector panels comprising the south roof deck that utilizes all three forms of the invention disclosed.
Figure 12:
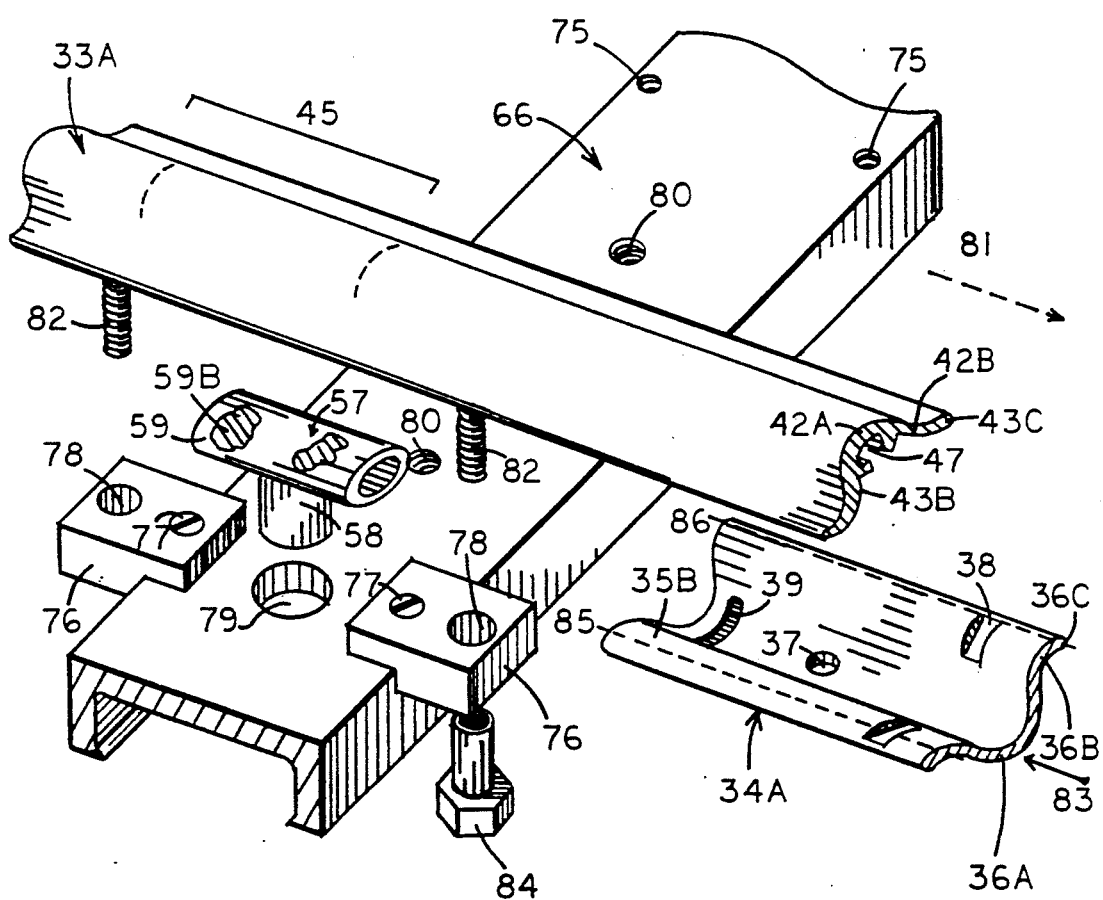
FIG. 12 is a pre-assembly drawing of the invention taken at rafter 66 of FIG. 11.
Figure 13:
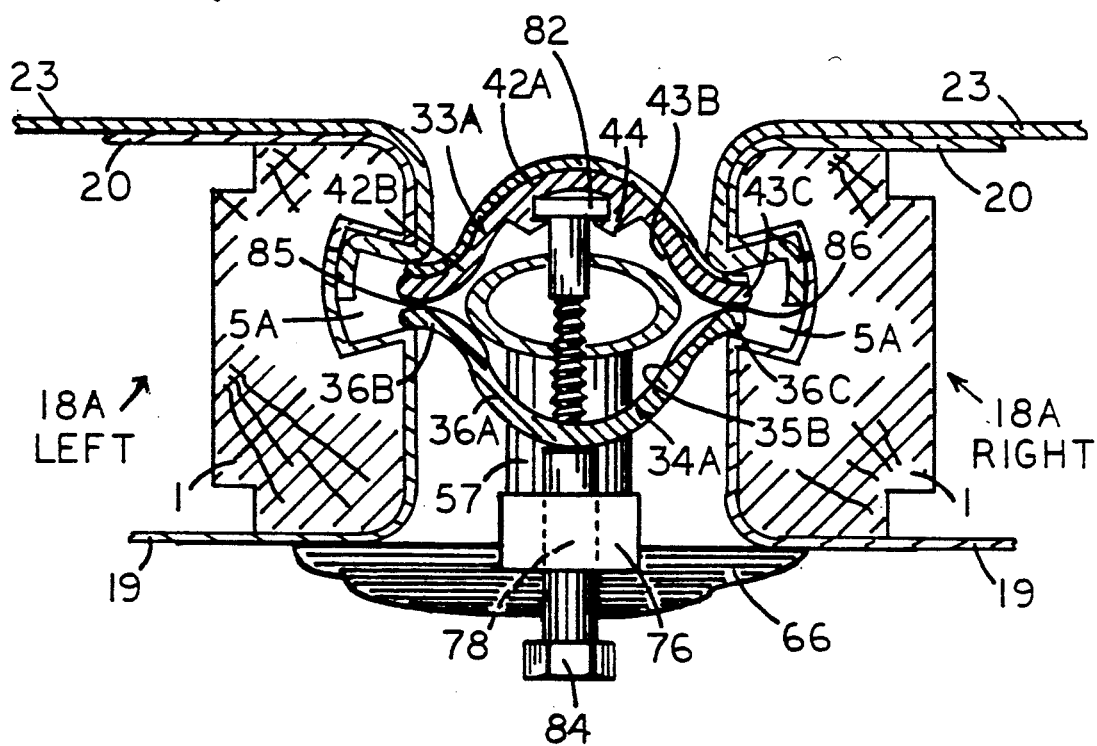
FIG. 13 is cross section at joint 71 of FIG. 11, showing the preferred form of the invention in unactuated position.
Figure 15:
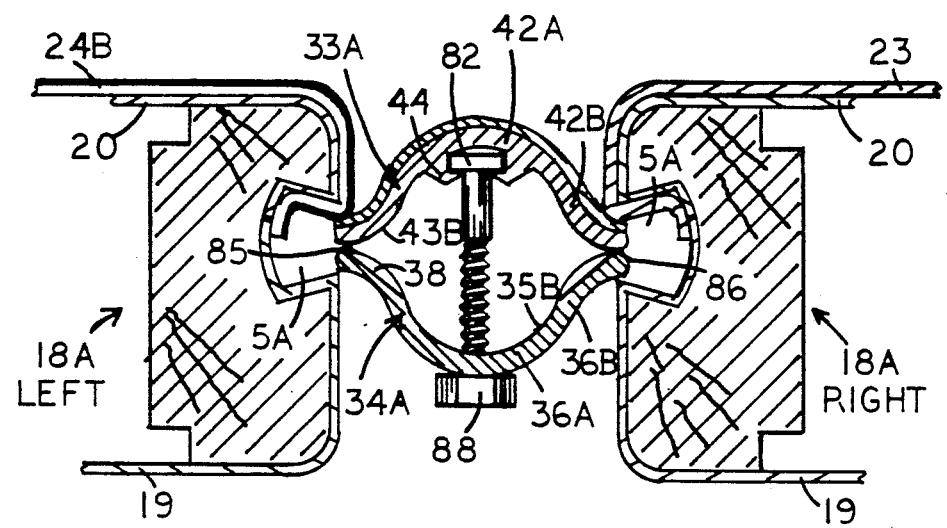
FIG. 15 is a cross section at joint 71 taken at mid-span between rafters 66 and 67 of FIG. 11, again showing the unactuated position of the invention.
Figure 19:
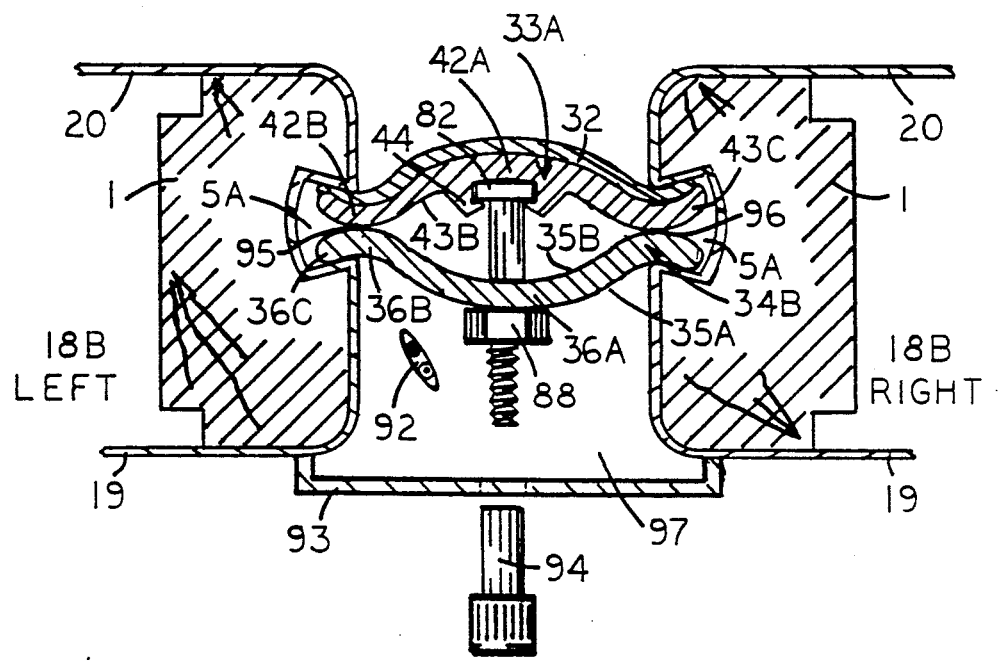
FIG. 19 is a partial cross section taken at joint 72 of FIG. 11, showing an alternate form of the invention in actuated position.

FIG. 11 shows an conventional roof truss roof building 65 in construction utilizing the preferred and alternate forms of the invention in the assembly of the roof deck. Solar component panels 18A are shown attached to the south slope of the roof; while structural panels 18B are shown attached to the north slope. FIG. 12 is a perspective view of pre-connection assembly operations at the upper level of central rafter 66. FIG. 13 (and 14) are cross sections of the connector system at joint 71, just west of rafter 66 looking east. FIGS. 15 (and 16) is a cross section of the same connector system at midspan between rafter 67 and rafter 66. FIG. 19 is a cross section of the completed alternate form of the invention joining two structural panels 18B at joint 72 mid-span between rafters 68 and 69, looking east. FIGS. 21 (and 22) are cross sections of the alternate form of the invention joining ends of panels taken through joint 73 at rafter 66, (viewed up the pitch of the roof).

FIG. 12 is a preassembly sketch showing the relationship between assembled parts of the invention and the building framework. Tapped holes 75 are cut near the edges of rafter 66 (preferably an aluminum extrusion), on centers equivalent to panel width+panel spacing. Riser blocks 76, (milled and cut from rectangular bar) are then bolted to 66 using flathead screws 77 to provide attachment points (through holes 78) between the roof deck and the structural building truss.

Large through holes 79 are cut at every other joint line to accomodate pipe tees 57 returning heated air to the central rafter from collector panels 18A. Additionally, spaced tapped holes 80 are cut at the centerline of the rafter to be used in the alternate form of the invention. (FIGS. 20–22).

In the field assembly of the building, ledge connector 33A is unreeled and pulled over all the rafters, (Dashed arrow 81). It is positioned so that area 45 lies over the rafter. T head bolts 82 are inserted into channel 47 and positioned over through holes 78 while pipe tee side arm 58 is slid into hole 79. Manifold connector 34A is then moved into position (arrow 83) so that shallow slot 39 lies under cross pipe 59 and through hole 37 lies over hole 78. Connector 33A is then lowered with T head bolts passing through holes 37. Hex head sleeve nut 84 is then hand tightened to secure the assembly bringing inner surfaces 35B and 43B into contact at the axes of the future joints (dotted lines 85 and 86). The next panel to be attached is then moved into position resting on the ledge.

FIG. 13 shows the unactuated position of the preferred form of the invention, before connection of panels 18A Left and 18A Right. T head bolt 82 is secured by ledges 44 in connector 33A and threaded into sleeve nut 84 below the manifold connector 34A. Sleeve nut 84 also engages riser 76 by means of through hole 78.

Inner surfaces 43B and 35B meet at joint axes 85 and 86 to the left and right respectively. (see also FIG. 12). Major arched portions 42A and 36A are still in unactuated shapes as shown in FIGS. 7, 8, and 12. Minor arched portions 42B and 36B are still angled approx 45° to the centerline, (now occupied by the T head bolt). Tips 36C and 43 C are positioned parallel and proximal to the openings of dovetail shaped channels 5A in side rails 1. The channels are now lined with exterior skin 20, interior skin 19, and corrugated film 23, (cut in this section along rib 24A). Pipe tee 57 is secured in the rafter but not yet clamped by the connector system.

The connector system is actuated by tightening sleeve nut 84 onto T head bolt 82. Inner surfaces 43B and 35B function as resisting plates for opposed flexible connectors (see summary) deflecting the motion of the minor arched portions into the dovetail shaped channels as major arched portions 42A and 36A are progressively flattened.

The clamping means for connector 33A therefore comprises the tightening of nut 84 onto bolt 82 and the resisting plate provided by inner surface 35B. The clamping means for connector 34A comprises the tightening of nut 84 onto bolt 82 and the resisting plate provided by inner surface 43B. The connector system is easily released and panels detached by loosening nut 84.

FIG. 14 shows the same system in fully actuated position. Panels 18A left and right are secured to one another and to rafter 66 by means of bolt 82, nut 84 and riser 76. Major arched portions 42A and 36A are flattened relative to the shapes of FIG. 13. Minor arched portions 42B and 36B are locked into dovetail channels 5A through the levering action of the flexible connectors acting through joint axes 85 and 86. Sealing strip 32 is compressed against corrugated film 23 on both sides providing a secure weather strip across the entire roof.

Inner surfaces 43B and 35B now securely clamp pipe tee 57 and have displaced caulk 59B to fill the triangular spaces between the tee and the inner surfaces. Slots 38 have rotated to 90° to bolt 82 allowing free flow of air from lumen 59A through the manifold assembly formed by joined connectors 33A and 34A, through slots 38 into the open spaces remaining in channels 5A and then into capillaries 24B (see FIG. 5).

Figure 16:
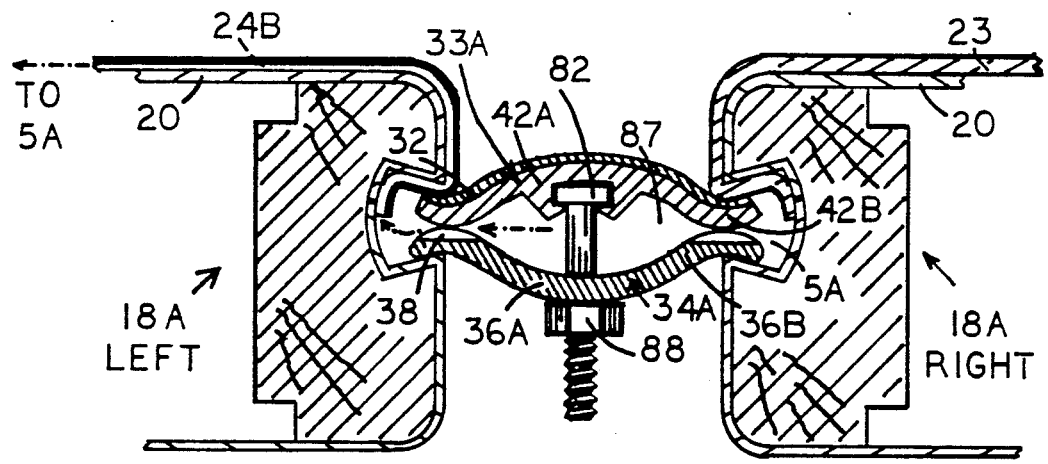
FIG. 16 is the same view as FIG. 15, except showing the actuated position of the invention.

FIGS. 15 and 16 show the same connector/manifold system, connecting the same panels at one of the periodic T head bolts positioned for mid-span attachment. FIG. 15 shows the connector system in the unactuated position, while FIG. 16 shows the actuated position of the connector system.

The invention and method of assembly are the same as that shown in FIGS. 12–14 with sleeve nut 84 being replaced here with ordinary hex nut 88, in both the assembly and the description of the clamping means. Additionally rafter 66, riser 76 and pipe tee 57 are omitted from the assembly and description of the invention.

Referring to FIG. 16, air flow patterns in the use of the flexible connector as a manifold and the building component panel as a solar collector can be followed by reference to the dotted arrows moving to the left from lumen 87 formed by the connector pair 33A–34A. Air is evenly distributed along the length of channels 5A both by the small pressure drop of slot 38 and the fluid resistance of capillaries 24A. Escape of air at eaves is prevented by the use of plugs 62.

Figure 17:
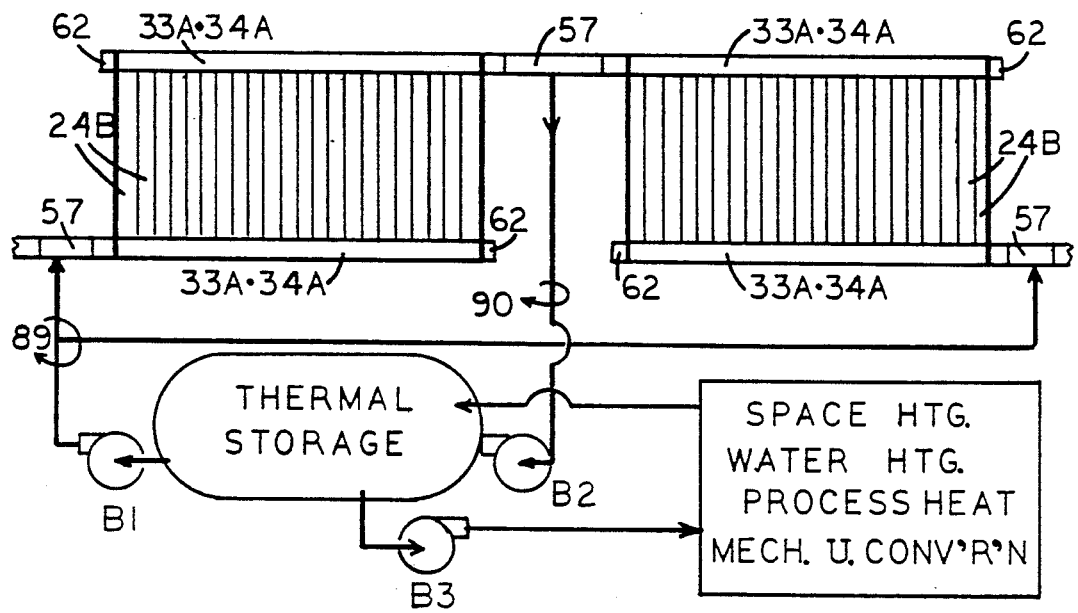
FIG. 17 is a schematic showing one method of using the invention detailed in FIGS. 12-16.

FIG. 17 is a schematic showing one method of using the invention disclosed in FIGS. 12–16. Air (or other working fluid) is drawn from a thermal storage tank and blown (or pumped) by blower B1 through supply duct system 89 to pipe tees 57. It is distributed to capillaries 24B by means of connector pairs 33A–34A. Passing through the capillaries, it picks up heat (see FIG. 5) and reenters 33A–34A by means of channels 5A and slots 38A. Heated air returns to the storage tank by means of pipe tees 57, return ductwork 90 and blower B2.

Heated air can then be removed by blower B3 for practical uses listed in the schematic.

The utilization method of FIG. 17 is particularly suited for northern climates where it can also be used as an "auto defrost" system for snow drifted roofs.

Figure 18:
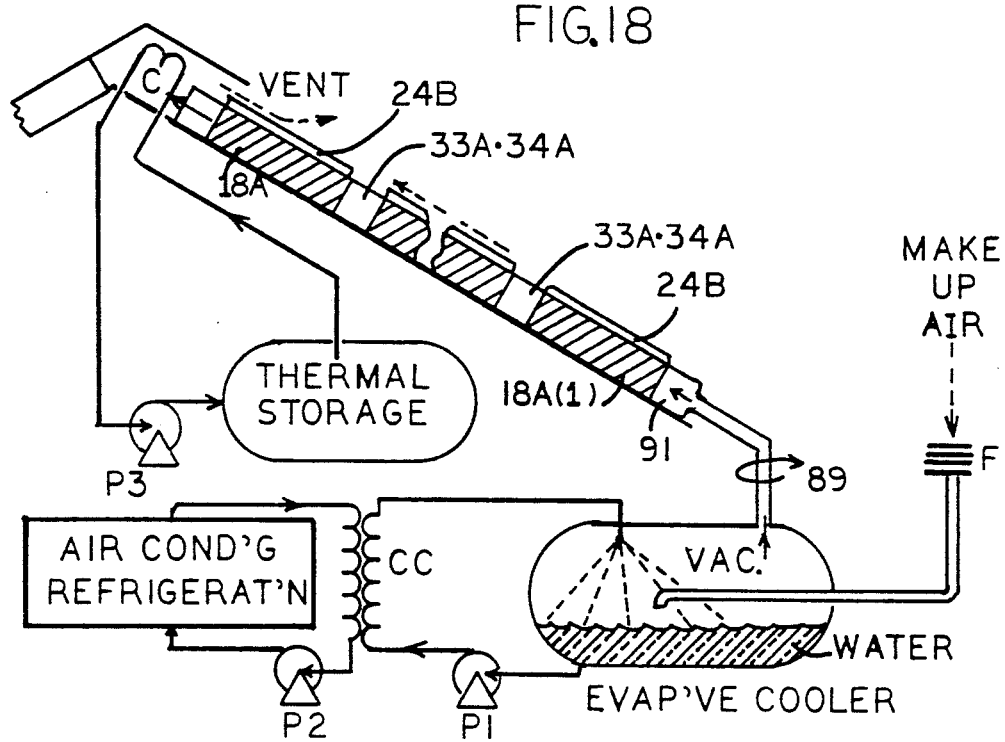
FIG. 18 is a schematic showing an alternate method of using the same invention.

FIG. 18 is a schematic showing another method of using the invention disclosed in FIGS. 12–16 that could find use in warmer climates. Air is fed through supply ductwork 89 to a housing 91 enclosing all the collectors 18A (1) situated at the first tier of the roof. Air is heated by successive panels 18A in capillaries 24B and is transferred from panel to panel by means of connector pairs 33A–34A. The draft creates a significant vacuum in the evaporative cooler which cools the water circulating through pump P1. Chilled water passes through counter current heat exchanger CC, where it serves as a heat sink for air conditioning/refrigeration systems, (served by circulating pump P2).

Heated air simply vents out a ridge vent, first passing by finned coil C; where some heat is recovered to a storage tank by means of circulating pump P3.

While the preferred form of the invention described in FIGS. 12–18 provides an economical and effective means of providing solar/structural building panels, the use of example building 65 is not meant to limit the invention. Clearly the invention could be adapted to all manner of structures and vehicles with only slight modifications.

FIG. 19 shows an alternate form of the invention joining two structural panels 18B on the north side of the building. The connector system is shown after actuation; unactuated shapes of the connectors can be seen in FIGS. 7 and 8; with the only significant difference between connector 36B and 36A (shown in FIG. 7) being the absence of slots 38 and 39.

Panels 18B are made by the same process as panels 18A differing only as discussed earlier.

The assembly and actuation processes used in assembling the connector system are analogous to the preferred form of the invention. Namely: Major arched portions 42A and 36A were drawn toward one another and flattened relative to thier unactuated shapes by the action of tightening nut 88 onto T head bolt 82. Interior surfaces 43B and 35B, initially met at joint axes 95 and 96; near tips 43C and 36C. As actuation proceeded minor arched portions 42B and 36B moved radially outward from axes 95 and 96 locking into dovetail channels 5A.

The description of clamping means is identical to that given for FIGS. 15 and 16.

Also in FIG. 19, cover plate 93, (also made by profile extrusion) is shown about to be attached to the excess threads of bolt 82 by allen nut 94. The space 97 enclosed by the interior skins 19, outer surface 35A and the cover plate can be used as a conduit for the protection of wiring 92 passing through the building structure. Alternatively space 97 can be filled with insulation.

A second alternative form of the invention is shown in FIGS. 20–22 joining the end portions of panels 18A. FIG. 20 is a preassembly elevation drawing showing parts used and positioning prior to use of the invention. Joint 73A (FIG. 11) is exposed, looking east.

After completion of connector systems 33A–34A on either side of the center panel, tee beam 48 is inserted into dovetail channel 5B in the end rail (2) of the panel. Flaps 54 A are positioned between 33A and 34A on the up slope side and above 33A on the downslope side.

Connector 33B is temporarily mounted on installation screws 98 by means of optional holes 46 (see FIG. 8). Screws 98 are prethreaded through rafter 66 by means of tapped holes 80, (see also FIG. 12). The adjacent panel to 18A (center) is moved into position on the ledge and the connector system is ready for attachment.

FIG. 21 is a cross section through joint 73 before actuation, FIG. 22 is the same view after actuation. Connector 33B is identical to 33A with the exception that laminate 32 is ommitted and optional tapped holes 46 are cut into 33B.

Installation screw 98 is an ordinary socket head with a short section at the top turned down to fit inside the thread radius of holes 46. As in the earlier disclosure, inner surface 43B meets the resisting plate provided here by surface 56 of tee beam 48 at joint axes 99 and 100.

Tightening of screw 98 flattens the major arched portion 42A of the connector and drives minor arched portions 42B into engagement with channels 5B to the west and east. As actuation is completed serif 52 locks into channel 47 between ledges 44, forming the third element of the clamping means. Installation screw 98 can then be removed. Release of the connector system is accomplished by passing a smaller screw through hole 80, engaging the threads of tapped hole 46 and popping the serif out of channel 47.

It is hoped that the inventions herein described will form the basis for new technological and economic innovations within our country and also particularly in developing third world nations.

I claim:

1. A connector system for joining parts to form a larger structure, said system comprising:

at least one flexible connector having a relatively flattened actuated shape and a curved unactuated shape, and having an outer surface and an inner surface, said connector being elongated in a first direction and having a major arched portion with concave curvature toward said inner surface and at least one minor arched portion with convex curvature toward said inner surface extending transverse to said direction of elongation, said at least one minor arched portion ending in a tip section, clamping means capable of engaging said at least one flexible connector at at least two points, and including a pulling means capable of engaging said at least one flexible connector between said at least two points, and a holding means capable of holding said major arched portion in said relatively flattened actuated shape, and at least one component having at least one channel with an opening extending into a roughly dovetail interior shape, said shape being such that said tip section and a portion of said clamping means may be inserted into said opening when said at least one flexible connector assumes said unactuated shape, and such that said tip section will engage said interior shape when said at least one flexible connector assumes said actuated shape.

2. The connector system of claim 1, wherein said clamping means comprises a second flexible connector and said pulling means and holding means comprise a bolt and nut engaging both said flexible connectors between said at least two points.

3. The connector system of claim 1, wherein said major arched portion has a centerline and two sides, and a minor arched portions is provided at each of said two sides; whereby two of said components may be joined in opposing relationship about said at least one flexible connector, each of said components having a channel opening extending into a roughly dovetail interior shape.

4. The connector system of claim 3, wherein said inner surface includes two spaced apart ledge shaped projections opposed about said centerline, said projections and said inner surface in combination forming a small channel with an opening extending into a roughly capital C shaped interior shape; whereby part of said clamping means may be captured by said projections to provide an anchor for said clamping means.

5. The connector system of claim 4, wherein said clamping means comprises a tee beam, said tee beam being elongated in said first direction, and having a wide flange normal to a web transverse to said direction of elongation, said web ending in a serif, said serif being shaped such that it may be inserted into said small channel opening and held between said ledge shaped projections; whereby the serif and ledge shaped projections in combination provide said holding means.

6. The connector system of claim 1, wherein said pulling means comprises a normal force at said outer surface in the area of said major arched portion; whereby said actuated shape of said at least one flexible connector is achieved.

7. The connector system of claim 3, wherein said inner surface has a plurality of transverse slots at said minor arched portions, with said inner surface meeting said clamping means at two discontinuous joint axes, said joint axes being parallel and proximal to said channel openings in the actuated shape of said at least one flexible connector, and the flexible connector, the clamping means, and the transverse slots in combination comprise a manifold assembly, said manifold assembly including a pipe section bounded by said inner surface, said clamping means, and said joint axes, and further including a plurality of side branches bounded by said transverse slots and said clamping means;

whereby a working fluid can flow between said pipe section and said dovetail interior shaped channels by means of said side branches.

8. The connector system of claim 7, further including a working fluid and a means for the circulation of said working fluid to said manifold assembly.

9. The connector system of claim 8, wherein at least part of said means for working fluid circulation includes at least one pipe fitting with an outside mating surface such that said pipe fitting may be inserted between said inner surface and said clamping means when said flexible connector assumes said unactuated shape, and such that said pipe fitting may be held by said pipe section when said flexible connector assumes said actuated shape.

10. The connector system of claim 9, wherein said at least one pipe fitting is composed of an elastomeric material and said at least one flexible connector carries shallow gripping slots running tranversely on said inner surface in the area of said major arched portion.

11. The connector system of claim 3, further including at least one additional part engaged by said clamping means at at least one point, said additional part being secured to said clamping means when said at least one flexible connector assumes said actuated shape.

12. The connector system of claim 11, wherein said at least one additional part comprises a cover plate, with the cover plate/clamping means/two opposed components in combination forming a conduit assembly.

13. The connector system of claim 12, further including electrical wiring enclosed within said conduit assembly.

14. The connector system of claim 11, wherein said at least one additional part comprises a structural member; whereby two of said components and said structural member may be secured to one another by the flexible connector and clamping means when said at least one flexible connector assumes said actuated shape.

15. The connector system of claim 1, further including a metal foil bonded to said outer surface of said at least one flexible connector.

16. The connector system of claim 1, wherein said outer surface of said at least one flexible connector is composed of an elastomeric material.

17. The connector system of claim 1, wherein said at least one component has an exterior face and an interior face roughly parallel and congruent to one another, said faces being connected by at least three edge surfaces, said at least three edge surfaces having at least two of said dovetail interior shaped channels; whereby structures of many different sizes and geometries may be assembled by means of said connector system.

18. The connector system of claim 17, wherein said at least one component comprises an assembly of two or more subcomponents, at least one of said subcomponents including an interior wall portion extending from said opening and at least partly lining said at least two dovetail interior shaped channels.

19. The connector system of claim 18, wherein said at least one co,ponent comprises a building panel and wherein said subcomponents comprise at least an internal frame and an exterior skin covering said exterior face, said exterior skin extending into said at least two dovetail interior shaped channels and comprising said interior wall portion.

20. The connector system of claim 19, further including a corrugated polymeric film with dimensions roughly equal to said exterior skin and having a multiplicity of parallel ribs, said ribs oriented in a direction between two of said edge surfaces having said dovetail interior shaped channels, said corrugated film bonded to said exterior skin at said ribs and including parts of said corrugated film comprising said interior wall portions, the corrugated film and exterior skin in combination forming a multiplicity of capillaries with apertures opening on said two dovetail interior shaped channels;

whereby a working fluid supplied to one of said channels, may enter said apertures, flow through said capillaries exchanging heat with said corrugated film and said exterior skin, and then exit through the apertures to the other said channels.

21. The connector system of claim 20, further including a working fluid and a means for circulation of said working fluid to said capillaries.

22. The connector system of claim 20, wherein said corrugated polymeric film is composed primarily of polyvinylidene fluoride and wherein said exterior skin is composed of sheet metal coated with a polyvinylidene fluoride based paint.

* * * * *